A. G. BUSBEA.
NUT LOCK.
APPLICATION FILED MAY 29, 1909.
994,244.
Patented June 6, 1911.
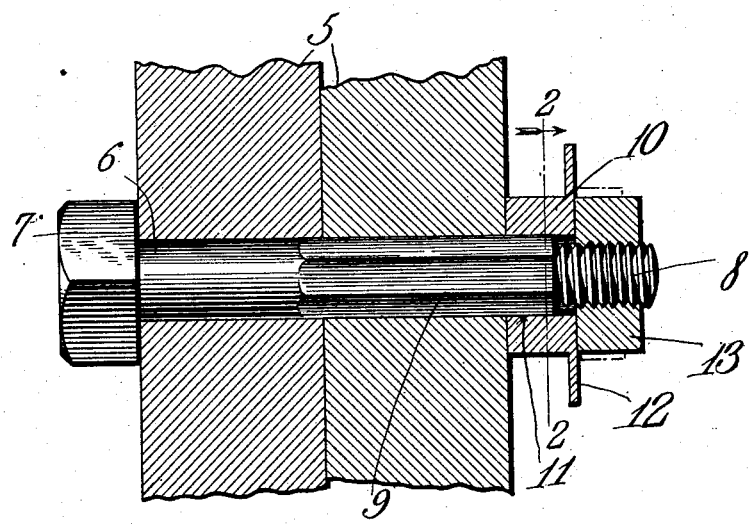
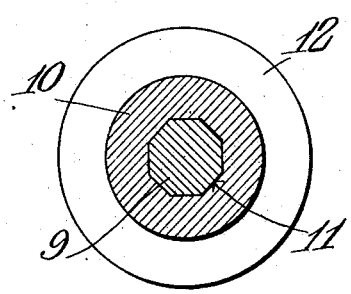
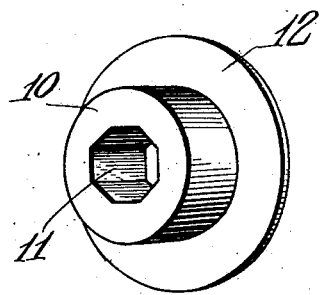
Witnesses
Inventor
Albert G. Busbea
By C. A. Snow & Co.
Attorneys

UNITED STATES PATENT OFFICE.

ALBERT G. BUSBEA, OF BRUNDIDGE, ARKANSAS, ASSIGNOR OF ONE-HALF TO DOSS, THOMPSON CO., OF BEEBE, ARKANSAS.

NUT-LOCK.

994,244.     Specification of Letters Patent.     Patented June 6, 1911.

Application filed May 29, 1909. Serial No. 499,251.

*To all whom it may concern:*

Be it known that I, ALBERT G. BUSBEA, a citizen of the United States, residing at Brundidge, in the county of White and State of Arkansas, have invented a new and useful Nut-Lock, of which the following is a specification.

It is the object of the present invention to provide an improved construction of nut lock and the invention resides particularly in the provision of an improved construction of nut locking washer or collar, it being the aim of the invention to provide for locking of a nut at any point to which it may be adjusted.

In carrying out the invention the bolt is of polygonal formation through a portion of its length and is threaded throughout an adjacent portion for the engagement thereon of the ordinary nut, the washer embodying the invention being in the form of a cylindrical collar having a polygonal opening therethrough to receive the polygonal portion of the bolt and also more or less of the threaded portion thereof. Ordinarily, such washers are formed from sheet metal and when under stress, their openings are liable to be reamed so as to permit of free rotation of the nut upon the bolt or of rotation of the bolt with respect to the nut but by embodying the washer in a lock collar, the bearing afforded is sufficient to entirely obviate any reaming of the opening through the collar.

In the accompanying drawings, Figure 1 is a view showing the bolt in elevation and the nut and lock collar in vertical section. Fig. 2 is a vertical transverse sectional view on the line 2—2 of Fig. 1 looking in the direction indicated by the arrows, and Fig. 3 is a perspective view in detail of the lock collar.

In the drawings, the bolt, nut, and locking collar are shown as assembled with two elements 5 to be secured together and the said bolt has its shank indicated by the numeral 6 and formed with a head 7, the shank being threaded at the other end as at 8 and being of polygonal formation inwardly of its threaded portion as indicated by the numeral 9. It will be observed that the shank of the bolt, throughout its threaded portion, is of a diameter slightly less than throughout its polygonal portion.

The lock washer or collar embodying the present invention is in the form of a collar 10 which is cylindrical and is formed with a polygonal opening 11 which receives the polygonal portion 9 of the bolt shank 6 and upon its circumferential surface, this collar is formed with a radially directed circumscribing flange 12 the peripheral edge of which is concentric with respect to the said circumferential surface of the collar. As clearly shown in Fig. 1 of the drawings, this collar 10 is of such length or width as to embrace not only a portion of the polygonal portion of the bolt shank but also more or less of the threaded portion 8 thereof so that when the nut, indicated by the numeral 13, is threaded upon the bolt, it may be tightened to the full extent and without likelihood of its threads coming in engagement with the said polygonal portion of the bolt shank. It will further be understood that owing to the large amount of bearing surface presented by the collar to the polygonal portion of the bolt shank, the wall of the opening through the collar will not be liable to become reamed upon stress being placed upon the bolt or the nut thereon.

After the nut 13 has been threaded upon the bolt until it comes in contact with that face of the collar at which the flange 12 is formed, this flange is bent down at one or more points so as to bear against one or more faces of the nut 13 and thereby hold the nut against rotation upon the bolt. It will be understood of course that by having the collar of cylindrical form the flange 12 may be bent down into engagement with the faces of the nut at any desired point or in other words regardless of the position to which the nut is adjusted; this is true also whether the nut be formed with four, six, or any number of sides or faces.

What is claimed is:—

In a device of the class described, a bolt having a shank threaded throughout a portion of its length and polygonal throughout an adjacent portion of its length, a lock sleeve having a polygonal bore to receive the polygonal and threaded portions of the shank, the sleeve being formed with a flange at that end adjacent the threaded portion of the shank, and a nut threaded upon the shank and having a face bearing against the end of the locking sleeve at which the flange is formed, said face of the nut being plane, the flange having a portion bent into engagement with the side of the nut.

In testimony that I claim the foregoing as my own, I have hereto affixed my signature in the presence of two witnesses.

ALBERT $\underset{\text{mark}}{\overset{\text{his}}{\times}}$ G. BUSBEA.

Witnesses:
J. E. TURNAGE,
G. H. MILLS.

Copies of this patent may be obtained for five cents each, by addressing the " Commissioner of Patents, Washington, D. C."